INVENTORS
BLAIR E. CORNISH
EUGENE P. DAMM, JR.
MARK A. FAIGENBAUM

BY Robert Lieber

ATTORNEY

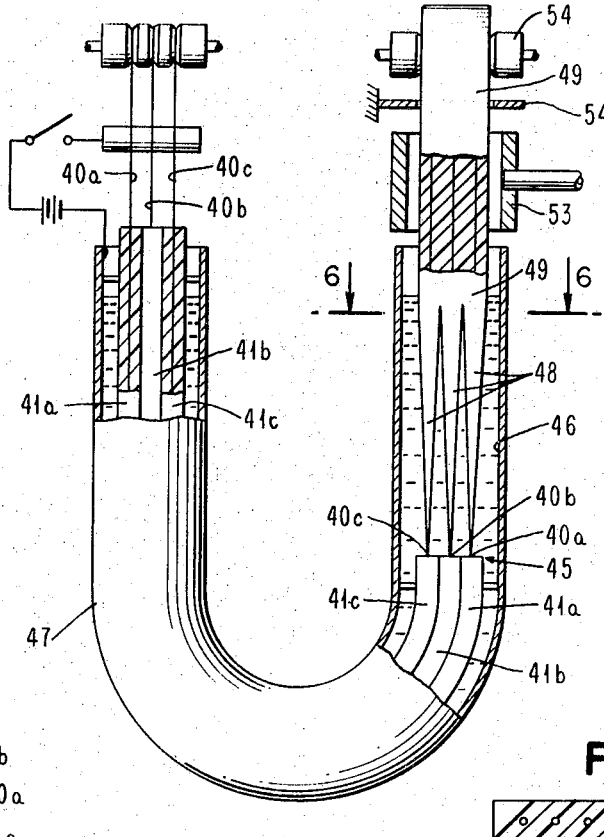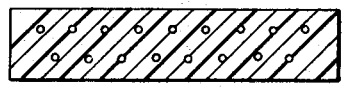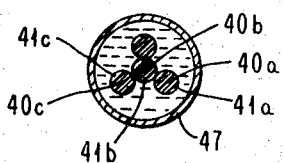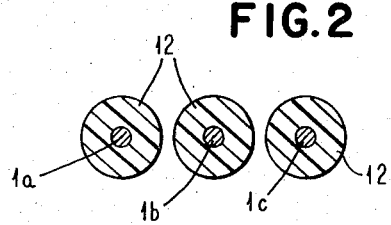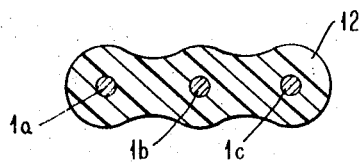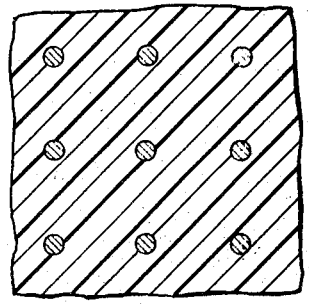

United States Patent Office 3,645,873
Patented Feb. 29, 1972

3,645,873
METHOD OF PRODUCING INSULATED WIRE ASSEMBLIES
Blair E. Cornish, Stone Ridge, and Eugene P. Damm, Jr., and Mark A. Faigenbaum, Poughkeepsie, N.Y., assignors to International Business Machines Corporation, Armonk, N.Y.
Filed June 30, 1969, Ser. No. 837,568
Int. Cl. B01k 5/02; C23b 13/00
U.S. Cl. 204—181                                                7 Claims

ABSTRACT OF THE DISCLOSURE

Insulative film coatings formed upon separated metal wires by electrophoretic deposition from aqueous polymer latex dispersions are found to be conjoinable into supporting structures which are thick by comparison to diameters of enclosed wires and which have pre-determinable dimensional properties when solidified. Electrical signal transmission lines are made at reduced cost by this process. Wires in such lines are held close together without touching at spacing distances held to tight tolerances. The electrophoretically applied insulating-supporting structure of these lines can be provided with such other desirable features as internal continuity (i.e. crack-free, void-free), thermal stability, abrasion resistance, high dielectric strength, flexibility, and uniform cohesion to the supported wires.

BACKGROUND OF THE INVENTION

(1) Field of the invention

The invention relates to the embedding and retention of assemblies of separated wires in a solid essentially crack-free insulation support by electrophoretic deposition of polymeric film coatings upon the wires. In the manufacture of articles such as electrical cables and signal transmission lines it is useful to be able to embed two or more wires in a solid crack-free dimensionally stable and thermally stable dielectric medium subject to uniform coherence to the wires, uniform dielectric properties and susceptivity to tight tolerance control of inter-wire spacing. Therefore the present invention pertains more specifically to the manufacture of cable structures with covering and supporting insulation having the foregoing properties, by the process of electrophoretic deposition. In this process insulation materials are deposited upon separated and unsupported wires and the deposits are permitted to expand in thickness until they conjoin into a unified structure which is then dried and solidified.

(2) Description of the prior art

It is known that plural wires can be embedded in solid insulation by electrophoretic deposition or similar electrodeposition processes. However prior art relating to this subject so far as we are aware does not suggest a process for forming supporting structures for plural separated wires which would be suitable for applications presently under consideration.

U.S. Pat. No. 1,590,599, granted June 29, 1926 to E. Taylor discloses forming an insulative coating upon one wire by extruding dielectric material in viscous fluid form over the wire. The fluid and wire pass through an extrusion nozzle central with the wire. The patent implies without illustration that the apparatus and process can be adapted to form a supporting insulation structure for two or more parallel wires. However, according to the patent teaching such structure would be formed by parallel extrusion of the viscous coating substance over the wires through multiple nozzles, the viscous material being extruded in a pressurized but electrically neutral condition, and regeneration of the coating structure in a bath containing an electrified and conducting acid. It appears to us that if a united covering structure could be formed in this manner it would have uncertain inner unity and it would be difficult to control the separation distances between wires. The extrusion procedure appears to be costly and difficult to control.

Other patents disclose formation of film-like coatings upon two or more separated wires, ribbon, foils or other shaped electrically conductive objects and union of the coated articles either by application of heat and pressure, as shown for example in U.S. Pat. 2,556,257, granted June 12, 1951 to P. Denes, or by a separate coating operation in which an enveloping covering for the assembly is produced as shown in U.S. Pat. 2,707,703, granted May 3, 1955 to S. O. Dorst. These other techniques are believed to be subject to a number of difficulties in regard to control of manufacturing costs, control of spacing dimensions between the conductive objects and/or control of uniformity of physical and dielectric properties in the spaces between the objects.

Still another U.S. Pat. No. 2,820,752, issued to Heller on Jan. 21, 1958 discloses numerous aqueous polymer latex dispersions and codispersions of polymers and copolymers of tetrafluoroethylene as electrolytes for electrophoretic deposit of film coatings on single metallic substrates. Nothing is said in the patent concerning the use of such electrolytes to simultaneously form multiple fusible coatings; nor is consideration given to fusion of such coatings into unified support structures for multiple separated wires as contemplated herein.

Accordingly we have devised electrophoretic coating method and apparatus for forming insulating supporting structures upon plural separated electrically conductive objects, which avoid the foregoing disadvantages. United supporting structures produced by the present method can be made at low cost and provided with such advantageous properties as dimensional and thermal stability, adequate and uniform cohesion to the embedded wires, essentially void-free and crack-free inner structure, flexibility, susceptivity to tight tolerance control of inter-object spacing dimensions and other uniform physical and dielectric properties in the insulation including substantial thickness and high dielectric strength.

SUMMARY OF THE INVENTION

Our invention concerns the formation of a unified support structure of solid essentially void-free insulation upon plural separated electrically conductive objects, in particular wires, which are held separated by the support structure in a fixed spacing configuration. The method of formation is distinguished by a single-step electrophoretic deposition procedure in which individual dielectric deposits forming upon multiple separated wires, by electrophoresis from an aqueous polymer latex dispersion, are permitted to merge and become fused into a unified support structure retaining the wires separated with predetermined spacing. When dried and properly solidified this unified structure retains the objects in a spaced configuration of stable and pre-determinable dimensions. It has been found that such structures can be made in substantial thicknesses with uniform cohesion to the supported wires, and essentially free of inner cracks and voids, by using particular coating bath compositions specified herein. It has also been found that spaces between wires in the hardened structure can be controlled to tight tolerances. In this manner we have been able for example to construct at low cost high quality tri-lead transmission cables for conveying high frequency electrical signals through separated wires spaced closely together to tight spacing tolerances in the solidified insulation. Such cables are thermally stable and adapted or easily adaptable to a variety of high frequency signal transmission applications.

Some of the objects of the invention therefore are:

To economically provide unified structures for spacing and insulating separated conductive objects;

To construct specialized electrical devices and articles, such as multi-lead high frequency electric signal transmission cables, with such structures; and To provide process and apparatus for mass producing such coatings in a one-step electrophoretic deposition operation.

A more particular and comprehensive object is to provide unified supporting structures for retaining and spacing plural separated electricity conducting wires at predetermined separation distances subject to close tolerance control which structure is characterized further as: an essentially crack-free unitary electrophoretic deposit structure having high dielectric strength, dimensional and thermal stability, simplicity and low cost of manufacture, uniformly tight cohesion to the wires, flexibility, and predetermined deposition, fusion and drying properties conducive to tight tolerance control of wire spacing and to control of void formation (i.e. mud-cracking).

According to the present invention an assembly of multiple spaced wires, ribbons, foils or other electrically conductive objects, or objects with electrically conductive surfaces, is guided in a particular spacing configuration through an electrophoretic coating bath containing a cathodic electrode element and an aqueous polymer latex dispersion. The dispersion is formed for example by blending "hard" and "soft" polymer latices to provide coatings with the above-mentioned properties. A 60/40 weight percent blend of aqueously dispersed polytetrafluoroethylene ("hard" polymer) and epoxy ester ("soft" polymer) latices is found to produce satisfactory coatings characterized by: adaptability to form conjoinable essentially crack-free electrophoretic deposits upon metallic substrates. Such deposits can be formed in substantial thicknesses and fuse smoothly into unified dimensionally stable supporting structures of the kind presently contemplated.

Accordingly, by applying voltage between the objects of the above assembly and the above-mentioned cathodic element, coatings forming initially as separate electrophoretic deposits upon the spaced conductors of the assembly fuse and become conjoined into a unitary insulating and spacing structure having the previously mentioned qualities.

Other features of the invention relate to specific details of: coating bath and wire preparation; means employed to collectively space and guide the wires prior to and during formation of the enveloping coating; parameters of the coating process such as coating time, bath temperature, coating voltage, drying temperature; cross-linking temperature (if cross-linking is required); techniques to control the outer shape of the coating; and particular articles which can be produced by the coating process.

These and other objects, features, applications and advantages of the present invention should become apparent upon considering the following drawings and specific written description pertaining thereto.

BRIEF DESCRIPTION OF THE DRAWING

FIGS. 2 and 3 are section views of a three-lead (tri-lead) cable in progressive stages of formation;

FIG. 4 is a section view of a multi-lead (9-lead) cable formation;

FIG. 5 schematically shows an alternate form of process apparatus in accordance with the invention;

FIG. 6 is a section view through the apparatus of FIG. 5;

FIG. 7 is a section view of an alternate form of the apparatus of FIG. 5.

DETAILED DESCRIPTION

Figure 1:
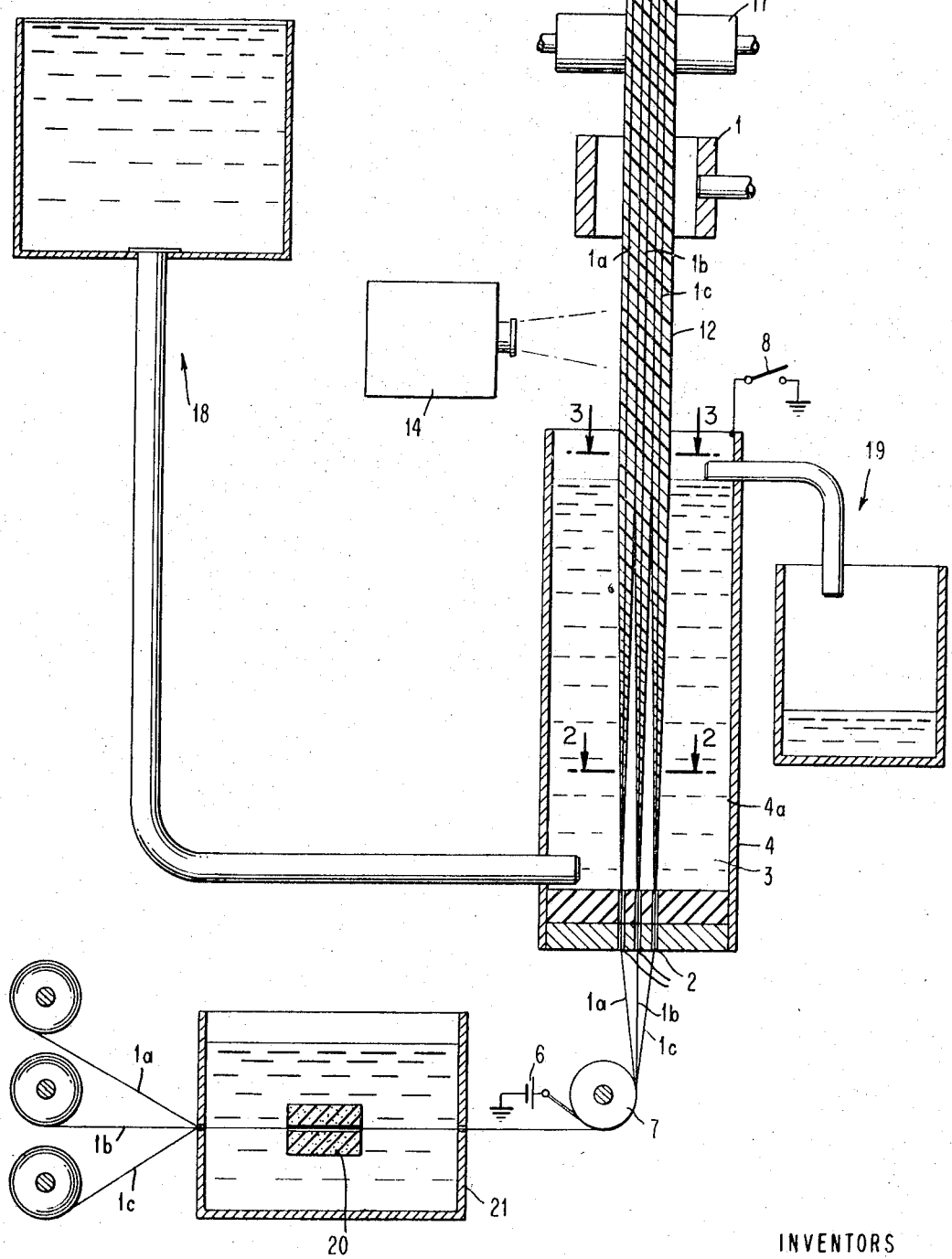
FIG. 1 illustrates the process apparatus schematically.

A freshly cleaned assembly of spaced conductors 1a, 1b, 1c (FIG. 1) prepared in the manner described later in this description, is led by means of guiding passages 2 or other suitable means into a fluid dispersion 3 contained in otherwise sealed coating vessel 4. Cylindrical section 4a of tank 4 is conductive and serves as a negative electrode relative to which the conductors 1a, 1b, 1c may be connected as anodes in an electrophoretic coating system. Positive voltage from a battery 6 or other source is connected in parallel through commutating roller 7 to the conductors 1a, 1b, 1c. Negative voltage (ground) connects source 6 through switch 8 to cathode element 4a of tank 4. Cathode element 4a may be internally lined with or made entirely of stainless steel, copper or other suitable metal.

With later-described aqueous polymer latices dispersed in the bath 3 a unitary essentially void-free dimensionally-stable coating 12 can be formed upon the initially bare conductors 1a, 1b, 1c, in a one-stage coating operation, provided however that restrictions as to voltage, timing and other requirements as detailed below are observed. Examples of the variety of encapsulated cable assembly configurations which can be produced in this manner are shown in FIGS. 3 and 4.

The coatings begin to form upon the individual conductors (FIG. 2). As the coatings expand they touch and fuse (FIG. 3) into a unitary embedding structure 12 distinguished by dimensional stability and continuity.

The outer dimensions of covering structure 12 can be varied by varying the spacing of the anodic conductors and the period of deposition.

As the coated assembly of wires is withdrawn from the bath at 13 (FIG. 1) the thickness of coating 12 is measured by conventional thickness measuring apparatus 14, to assure dimensional uniformity and the coating is dried, and if necessary sintered, by passage through one or more heat sources 15. The coated product is then collected for example upon a take-up reel 17.

Supply and overflow apparatus are generally indicated at 18 and 19. The coating may be applied continuously while the wires are moving through the bath. Process parameters are described next.

Wire-preparation

It is assumed that high quality "clean" wire stock is employed. The term "clean" is defined as stock which is free of surface greases or oils and has no areas of extensive oxidation or corrosion (e.g. AgS). A normal thin oxide coating for such metals as Cu or Al is not deleterious. In the case of suspect stock the following points are pertinent:

(A) Stock bearing evident extensive corrosion should be rejected. Thorough cleaning is usually improbable and economically unjustifiable.

(B) Grease or oil contamination may be removed by running the wire through a cleansing sponge 20 (FIG. 1) in a pre-cleansing bath 21 containing an appropriate solvent (e.g. 1,1,1-trichloroethane, commercially available halocarbon-isopropyl alcohol circuit cleaner, methyl ethyl ketone). Oven or air evaporation by means not shown in the drawing must be used to remove excess solvent before the wires are introduced into the electrophoretic coating bath apparatus.

(C) Inferior wire stock will yield erratic coating results e.g. non-coated areas, pinholes, thickness variations, and/or poor adhesion of the dielectric. Conversely these occurrences are indicative of an initially unclean stock surface.

(D) Numerous commercial products exist for removing minor corrosion products from specific metals. Usually these are buffered acidic solutions containing a chelating agent. A pre-bath in one of these solutions accompanied by rinsing and drying may be helpful in reclaiming lightly corroded stock. As an example it is noted that lightly corroded copper stock may be reclaimed by a pre-bath in such a buffered acidic solution sold commercially under the designation Metex.

Bath definition

The physical and chemical properties of the finished electrophoretically applied coating reflect properties of the component latices subject to variations affected by controlling blending ratio. Many commercial latices are compatible, leading to a wide range of blends, concentrations and dilutions satisfactory for specific applications. Two such blends which have been found to produce satisfactory multiple wire coating structures with the previously stated properties are:

Example 1: A 60/40 weight percent blend of latices of (A) polytetrafluoroethylene and (B) epoxy ester.
Example 2: A 60/40 weight percent blend of latices of (A) polytetrafluoroethylene and (C) styrene-butadiene.

Slight variations in blend ratio are useful to provide coatings with different flexibility, and dielectric properties. Typical properties for component latices (A), (B), and (C) above are summarized in Table 1.

TABLE 1.—TYPICAL LATICE PROPERTIES

| Property | Polytetrafluoroethylene (A) | Epoxy ester (B) | Styrene butadiene (C) |
| --- | --- | --- | --- |
| Emulsifier type | Anionic | Anionic | Anionic |
| Solids (percent) | 60 | 50±1 | 41 |
| pH | >7 | 7.9-8.5 | 10.0 |
| Surface tension (dynes cm.) | | | 50 |
| Viscosity | | (1) | 2 27 |

1 15-30 sec. (#4, Ford Cup, 25° C.).
2 #2 spindle at 6 r.p.m. Brookfield Viscosimeter.

Latice compatibility is usually determined experimentally, incompatible latices being recognized by precipitate formation, gradual destabilization, creaming or slow flocculation. Latices of widely differing pH value (say 3 units) or of differing surfactant concentration are usually incompatible.

Baths are operated at ambient temperature conditions. Operationally, bath quality is monitored by pH and percent solids measurements and most effectively by inspection of control part coatings.

Voltages

Deposition behavior in response to voltage in a function of the bath composition, electrode geometry and the metallic composition of the wire or other substrate. When copper is used as the wire substrate increasing voltage yields coatings of increasing compactness at constant coating times or equivalently coatings of particular compactness in progressively shorter coating times. Silver coated copper forms an excellent substrate.

Above a critical voltage certain metals (e.g. Au, Pd) yield bubbled coatings due to the anodic oxidation of water ($2H_2O \rightarrow O_2\uparrow + 4H^+ + 4e^-$). The electrode potential for this reaction may be shifted by the use of selected additives (e.g. KBr when coating Au) which allow coating at higher voltages. Generally the wires are coated at low DC potentials; for example, 20 volts for Cu and 4–6 volts for Ag.

Time

Coating thickness vs time data are reproducible and permit the precise definition of a coating procedure in order to obtain a desired coating thickness. Variations in thickness are generally considered signs of change in the coating materials or equipment. Thickness is therefore a useful parameter for monitoring the coating bath quality as by apparatus 14 (FIG. 1).

Dependent on the coating apparatus used, an empirical thickness vs time curve may be obtained. For mass coating operations upon nominal 10 mil wire thicknesses, coating times usually range from 3–10 seconds to produce 1–3 mil thick coatings. As expected coating times to obtain a particular thickness of deposit decrease with increasing bath conductivity. Coating time as well as maximum coating thickness achievable are dependent upon the particular latice blend used in the bath.

Drying and firing cycles

A programmed drying procedure should be used. Details vary according to the latice blend, deposit thickness and substrate area. These general points are significant (times given are for wire coating):

(a) *Air Dry*—Excess bath drainage and preliminary film shrinkage must be made to occur at room temperature in order to avoid a spotted or bubbled coating. Time: 10–40 secs.

(b) *Pre Dry* (<100° C.) and Bake (>100° C.)—Most of the entrained water must be removed below 100° C. in order to avoid vaporization which will lead to blow holes (voids) in the coating. Temperature rise should be programmed to vary from ambient to 90° C. in typically 3 minutes. Residual moisture removal is removed by baking in order to attain total film integration and full dielectric properties. Time: Empirical and contingent upon design considerations of coating drying stages.

(c) *Post Bake (Sintering)*—Several blends are deposited where one or more components serve only as a binder during initial film formation. Final properties are developed by removal at high temperatures of this component. For several polymers the glass temperature $T_g$ must be exceeded for optimum film integration.

(d) For wire coating a Kandel resistance wire wrapped glass tube furnace admits to convenient, effective and economic programming for a wide range of applied polymer coatings.

SUMMARY OF PROCESS PARAMETERS

Blends of specific polymer latices with "hard" (latice A) and "soft" (latices B and C) particles have been shown to be conducive to forming essentially void-free insulative films, with good adhesion properties, upon multiple wires. Such films are found to be subject to contact fusion in the wet state into unitary void-free and uniformly cohered retaining structures in which the spacing of the wires can be controlled at the time of merger.

The "hard" latices do not provide such structures per se because of mud-cracking and other void formation and adhesion problems which limit coating thickness and strength. Polytetrafluoroethylene latices, characterized by hard particles, have limited flexibility, low critical cracking thickness (i.e. tendency to form voids upon deposition), poor ability to adapt to contact fusion of multiple deposits, and poor cohesion to the wires. The epoxy ester and butadiene-styrene latices, characterized by soft particles, have poor dielectric strength and spacing retaining qualities. Yet when blended in the approximate ratios stated above unusual properties specified previously are obtained.

In general electrophoretic deposition suspensions used in the process of this invention to form unified multi-wire supporting structures may contain aqueously dispersed polymers or copolymers of tetrafluoroethylene as a principal solid ingredient. Such dispersions are described in U.S. Pat. 2,478,229, issued to Berry on Aug. 9, 1949, another U.S. Pat. 2,559,752, issued to Berry on July 10, 1951 and U.S. Pat. 2,820,752, issued to Heller on Jan. 21, 1958.

Codispersions in water of the polytetrafluoroethylene together with other film forming polymers—intended to produce thicker and more continuous electrophoretic deposits upon single wires—are described extensively in the above-cited patent to Heller, 2,820,752. Many of these codispersions will be useful to produce the conjoint spacing structures presently contemplated.

It is not altogether essential however that polytetrafluoroethylene be used as the principal solid ingredient of the coating suspension of the present application. It is observed that an essential property of the conjoined coating is dimensional stability; more specifically, ability upon solidification to retain embedded wires with predeterminable separation spacings. Consequently other materials with this property will be useful for this purpose. For instance, polyurethane latices are known to deposit with fair dimensional stability. However because of the softness of the solidified deposits supporting structures formed from this material will be more easily deformed than those formed from the blends given in the above examples. Rubber latices may also be considered for particular applications in which exactness of wire separation spacing is not critical; e.g. lamp-cords.

The drying and sintering phases above remove known volumes of moisture, binder and other volatile constituents from the united insulation deposit structure. Consequently by establishing predetermined spacing of wires in the wet structure, the final spacing of the wires can be controlled.

GUIDING AND SPACING MECHANISMS

FIG. 5 shows an alternative arrangement of bath vessel and guiding and spacing components for producing accurately and uniformly spaced aggregates suitable for use as electric signal transmission cables. The wires 40a, 40b, . . . are drawn through passages in tubes 41a, 41b, . . . having inner dimensions leaving very little clearance between wires and respective passage walls and having outer dimensions establishing predetermined spacing distances between tube centers.

As the wires emerge from the tubes into contact with the electrophoretic bath, at a predetermined position 45 relative to the cathodic inner surface 46 of the bath vessel 47, coatings 48 of the dielectric medium dispersed in the bath begin to form upon the individual wires and conjoin into a unified coating 49. The tubes 41 or at least the inner passage surfaces are made of material having a low coefficient of friction in order to facilitate passage of the wire into and through the bath. The same material is also selected to provide a predetermined surface tension (16–19 dynes/centimeter) at least at the region of interface 45 between bath fluid and tube openings. This prevents fluid from entering the small clearance space between the wires and tubes at such openings and thereby affords precise control of coating path length. One material having the foregoing properties is polytetrafluoroethylene. The guiding means 41 may be formed either as a bound collection of individual tubes (FIGS. 5, 6) or as a single molded element with spaced tubular passages (FIG. 7).

Initial insertion of the wires into the tube passages may be facilitated by employing a split vessel 47 which can be opened for access to the tubes. Starting lengths of the wires may be drawn uncoated through the heating region 53 and over the take-up reel 54 before the vessel is assembled and filled with fluid. A starting guide member 54a may be used to position the uncoated starting lengths of wires centrally in the path to be traced by the coated wires.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. In a process for producing an assembly of plural conductors separated and bound together by a solid insulation matrix having uniform adherence to the conductors and establishing uniform dielectric properties between the conductors, wherein said conductors are conveyed in a substantially parallel configuration through successive electrophoretic coating and solidifying stations effective in combination to produce a unified solid insulating matrix retaining said conductors, the improvement comprising:

electrophoretically coating said conductors in parallel, at said coating station, with an aqueously dispersed polymeric coating medium capable of forming discrete electrophoretic deposits which are conjoinable while wet into a cohesive dimensionally stable self supportive matrix; said polymeric medium consisting of a blend of aqueously dispersed latices including a first latex containing a hard resin blended compatibly with a second latex containing a softer (i.e. more flexible) resin.

2. A process for producing an assembly of plural relatively insulated conductors retained in and uniformly adherent to a flexible, crack-free and pore-free insulation matrix which establishes predetermined dielectric properties between the conductors comprising:

coating said conductors individually with electrophoretic deposits, by immersion of said conductors in a blend of aqueously dispersed latices of hard and soft polymers; and handling said coated conductors conjointly, with predetermined relative spacing and with the deposits in wet solvated condition, to effect fusion and solifiication of the individual wet deposits into a void-free and crack-free unified structure having homogeneous form throughout and having uniform and consistent dielectric and physical properties in relation to said conductors; including the property of uniform adherence to said conductors.

3. A process according to claim 2 wherein said conductors are parallel wires formed by the process into plural-lead transmission cable.

4. Process according to claim 2 wherein said hard polymer latex is formed from a dispersed resin selected from the group consisting of polymers and copolymers of tetrafluoroethylene and said soft polymer latex is formed from a dispersion of a film forming material selected from the group consisting of epoxy ester and copolymers of styrene butadiene.

5. Process according to claim 4 wherein the blend proportions in weight percent ratio of said hard and soft polymer latices is approximately 60/40.

6. A process for producing plural-lead flexible cable for transmission of alternating current electricity or the like comprising:

feeding plural pre-cleansed wires continuously through a bath containing a blend of aqueously dispersed hard and soft polymer latices, with discrete separations maintained between the wires; said bath and the latices therein defined by:

blend (hard/soft weight percent ratio): 60/40 (approximate);

hard latex: polytetrafluoroethylene in water, anionic, solids 60% (approximate), pH greater than 7;

soft latex: epoxy ester or styrene-butadiene in water, anionic, solids 50±1% (epoxy ester)— 41% (styrene-butadiene), pH 7.9–8.5 (epoxy ester)—10 (styrene-butadiene), viscosity 15–30 sec. (epoxy ester)—27 (styrene-butadiene);

contacting the wires with a source of voltage sufficient to form uniformly adherent polymer deposits thereon of predetermined thickness as the wires are fed through said bath;

permitting the forming deposits to touch in a wet condition at predetermined spacings and fuse into a continuously fed unified structure; and then, while continuing the feeding of said structure, successively drying said structure over a programmed cycle of temperatures beginning at room temperature (10–40 seconds) and proceeding to approximately 90° C. (in approximately 3 minutes);

baking said structure for an empirically established time at a temperature slightly in excess of 100° C. to effect removal of residual moisture and total film integration; and post-baking said baked structure at a temperature exceeding the glassing temperature Tg of the polymer blend forming the structure.

7. Process according to claim 6 wherein in said permitting step the said predetermined spacing is established with allowance for a predetermined anticipated shrinkage due to the volume of moisture, binder and other materials expected to be volatilized and removed in said drying, baking and post-baking steps.

References Cited

UNITED STATES PATENTS

| | | | |
|---|---|---|---|
| 2,707,703 | 5/1955 | Dorst | 204—181 |
| 3,054,712 | 9/1962 | Whitehurst | 204—181 |

HOWARD S. WILLIAMS, Primary Examiner